(12) United States Patent
Xu et al.

(10) Patent No.: US 11,775,834 B2
(45) Date of Patent: Oct. 3, 2023

(54) JOINT UPPER-BODY AND FACE DETECTION USING MULTI-TASK CASCADED CONVOLUTIONAL NETWORKS

(71) Applicant: Polycom, LLC, San Jose, CA (US)

(72) Inventors: Hai Xu, Beijing (CN); Xi Lu, Beijing (CN); Yongkang Fan, Beijing (CN); Wenxue He, Beijing (CN)

(73) Assignee: Polycom, LLC, San Jose, CA (US)

( * ) Notice: Subject to any disclaimer, the term of this patent is extended or adjusted under 35 U.S.C. 154(b) by 215 days.

(21) Appl. No.: 17/294,573

(22) PCT Filed: Nov. 22, 2018

(86) PCT No.: PCT/CN2018/116892
§ 371 (c)(1),
(2) Date: May 17, 2021

(87) PCT Pub. No.: WO2020/103068
PCT Pub. Date: May 28, 2020

(65) Prior Publication Data
US 2021/0409645 A1    Dec. 30, 2021

(51) Int. Cl.
*H04N 7/15*         (2006.01)
*G06N 3/082*        (2023.01)
*G06V 40/10*        (2022.01)
*G06V 40/16*        (2022.01)
*G06N 3/08*         (2023.01)
*G06N 3/045*        (2023.01)
(Continued)

(52) U.S. Cl.
CPC ............. *G06N 3/082* (2013.01); *G06N 3/045* (2023.01); *G06N 3/08* (2013.01); *G06V 10/454* (2022.01);
(Continued)

(58) Field of Classification Search
CPC ...... G06V 10/82; G06V 10/454; G06V 40/10; G06V 40/161; H04N 7/147; H04N 7/15;
(Continued)

(56) References Cited

U.S. PATENT DOCUMENTS 9,864,933 B1    1/2018  Cosic
10,108,850 B1   10/2018 Das et al.
(Continued)

FOREIGN PATENT DOCUMENTS

CN    106485215      3/2017
CN    106485215 A    3/2017
(Continued)

OTHER PUBLICATIONS

International Search Report and Written Opinion in co-pending PCT/CN2018/116892, dated Aug. 22, 2019, 9 pages.
(Continued)

*Primary Examiner* — Melur Ramakrishnaiah
(74) *Attorney, Agent, or Firm* — QUARLES & BRADY LLP (57) ABSTRACT

A videoconferencing endpoint is described that uses a cascading sequence of convolutional neural networks to perform face detection and upper body detection of participants in a videoconference at the endpoint, where at least one member of the sequence of neural networks performs upper body detection, and where the final member of the sequence of neural networks performs face detection based on the results of the upper body detection. The models of the neural networks are trained on both large datasets of faces well as images that have been distorted by a wide-angle camera of the videoconferencing endpoint.

21 Claims, 7 Drawing Sheets

(51) Int. Cl.
  *G06V 10/82* (2022.01)
  *G06V 10/44* (2022.01)
(52) U.S. Cl.
  CPC .............. *G06V 10/82* (2022.01); *G06V 40/10* (2022.01); *G06V 40/161* (2022.01); *H04N 7/15* (2013.01)
(58) Field of Classification Search
  CPC .......... G06N 3/082; G06N 3/045; G06N 3/08; G06N 3/048
  USPC ............................................ 348/14.01–14.16
  See application file for complete search history.

(56) References Cited

U.S. PATENT DOCUMENTS

| | | | |
|---|---|---|---|
| 2013/0050395 A1* | 2/2013 | Paoletti | G06V 40/172 348/E7.083 |
| 2014/0078372 A1 | 3/2014 | Yamashita et al. | |
| 2014/0184726 A1* | 7/2014 | Kim | H04N 23/63 348/14.07 |
| 2018/0068198 A1 | 3/2018 | Savvides et al. | |
| 2018/0096457 A1 | 4/2018 | Savvides et al. | |
| 2018/0300540 A1 | 10/2018 | Swisher et al. | |
| 2018/0330178 A1 | 11/2018 | Kaliouby et al. | |
| 2019/0356883 A1* | 11/2019 | Theien | H04N 7/152 |
| 2020/0160106 A1* | 5/2020 | Sivalingam | G06F 18/214 |

FOREIGN PATENT DOCUMENTS

| | | | |
|---|---|---|---|
| CN | 108256404 | 7/2018 | |
| WO | WO-2019068931 A1 * | 4/2019 | ......... G06K 9/00228 |

OTHER PUBLICATIONS

Bertrand, Frederic, Extended European Search Report dated Jun. 29, 2022, EP Patent Application No. 18940575.6, European Patent Office, dated Jun. 29, 2022.

* cited by examiner

JOINT UPPER-BODY AND FACE DETECTION USING MULTI-TASK CASCADED CONVOLUTIONAL NETWORKS

TECHNICAL FIELD

The present invention relates to the field of videoconferencing, and in particular to a technique for detecting faces for use by a videoconferencing endpoint.

BACKGROUND ART

Traditional face detection techniques were based on Haar-like features or Histogram of Ordered Gradients (HOG), such as are used in the OpenCV classifiers. These techniques are fast but not accurate enough. These techniques are also restricted to face detection only, with hand-crafted feature filters that are specific for given task.

Deep learning face detection techniques are more accurate and robust, especially for hard samples and are widely used today. Beside face detection, deep learning techniques can also be applied to other object detection tasks. However, deep learning technique for face detection have required high power computational resources that are not always available.

SUMMARY OF INVENTION

In one aspect, a method of detecting faces and upper bodies of participants in a videoconference comprises receiving video data from a camera of a videoconferencing endpoint; performing upper body detection in the video data using a first neural network; and performing face detection by a second neural network in areas of the video data identified by the upper body detection of the first neural network.

In a second aspect, a videoconferencing endpoint, comprises a housing; a camera, disposed in the housing; a processing unit, disposed in the housing and coupled to the camera; a memory, disposed in the housing and coupled to the processing unit and the camera, in which are stored instructions for performing face detection and upper body detection, comprising instructions that when executed cause the processing unit to: receive video data from the camera; perform upper body detection in the video data using a first neural network; and perform face detection by a second neural network in areas of the video data identified by the upper body detection of the first neural network.

In a third aspect, a videoconferencing endpoint configured for upper body and face detection, comprises a means for receiving video data from a camera; a first neural network means for detecting upper bodies in the received video data and producing upper body bounding box data; and a second neural network means for detecting faces in the received video data in areas identified as upper bodies by the first neural network means.

In a fourth aspect, a machine readable medium includes instructions that when executed cause a videoconferencing endpoint to perform the methods of the first aspect.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

As used herein, the term "or" means any of the alternatives and any combination of the alternatives, including all of the alternatives, unless the alternatives are explicitly indicated as mutually exclusive.

As used herein, the phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "couple" or "couples" means either an indirect or direct wired or wireless connection. Thus, if a first device couples to a second device, that connection may be through a direct connection or through an indirect connection via other devices and connections. The term "based on" means "based at least in part on." Therefore, if X is based on Y, X may be a function of Y and any number of other factors.

As used herein, the term "processing unit" can refer to a single hardware processing unit or a plurality of hardware processing units that together may be programmed to perform the indicated actions. The hardware processing units may be implemented as virtual hardware processing units of a virtual programmable device hosted on a physical hardware device. Instructions that when executed program the processing unit to perform an action may program any or all of the processing unit to perform the indicated action. Where the processing unit is one or more multi-core processors, instructions that when executed program the processing unit to perform an action may program any or all of the multiple cores to perform the indicated action.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As disclosed below, a cascade of deep learning models can detect both upper bodies and faces of participants in a videoconference at a videoconferencing endpoint fast and accurately. The techniques described below are designed specifically for low power processing elements while retaining accuracy, which traditional techniques cannot achieve. However, the same techniques can be used on higher power processing elements. Upper body detection is appropriate for a videoconferencing session because many of the participants will be seated at a conference table, thus only their upper bodies will be visible.

Figure 1:
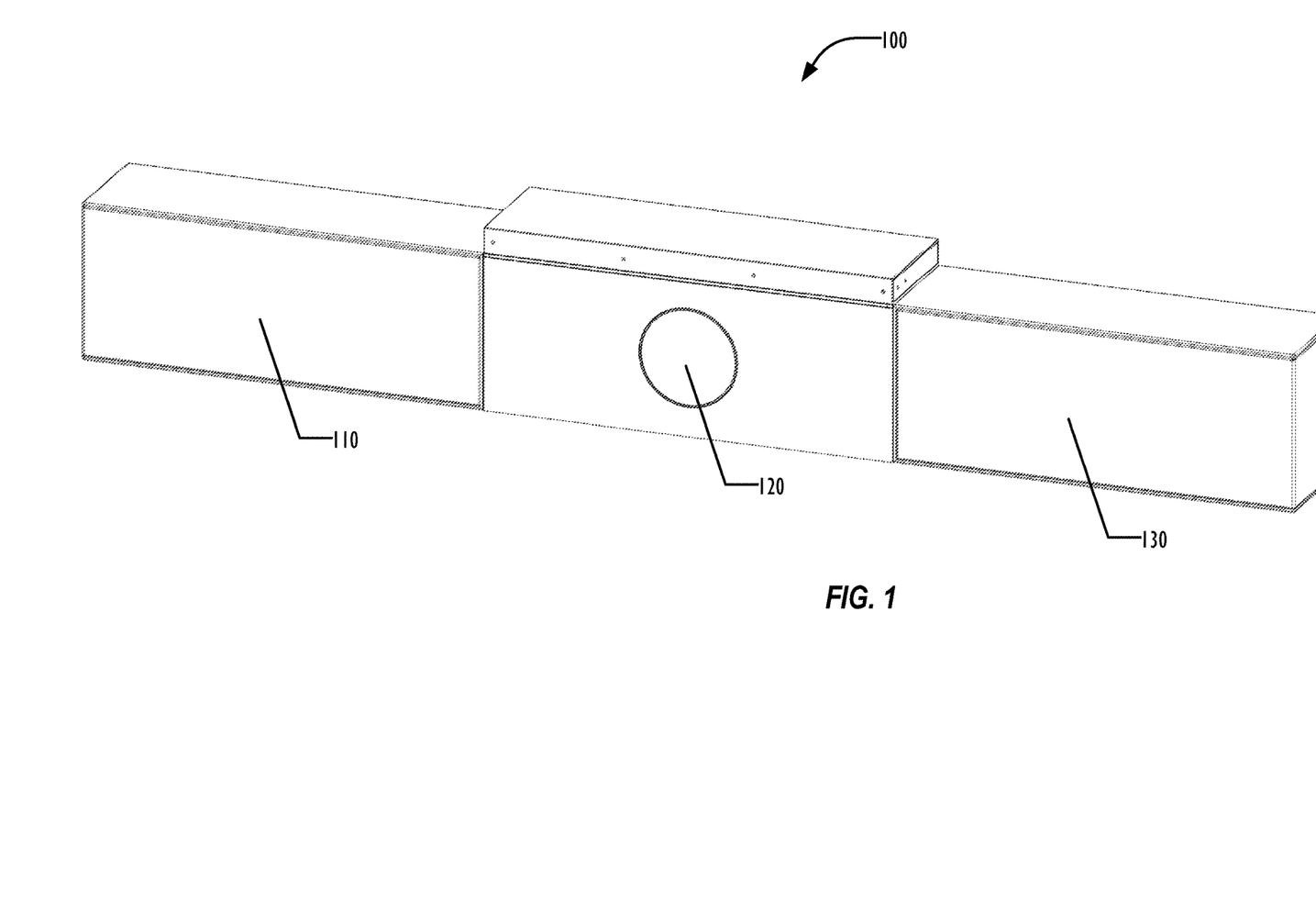
FIG. 1 is an isometric view illustrating a videoconferencing endpoint according to one embodiment.

Turning now to FIG. 1, at least one embodiment of a videoconferencing endpoint as described herein is an integral device 100 that includes stereo loudspeakers 110 and 130, at least one high resolution camera 120, and at least one microphone array. The stereo loudspeakers 110, 130 are preferably of high quality. The high-quality stereo speakers 110, 130 are spaced to produce a good spatial audio image.

In one embodiment, the integral device 100 includes a housing that is a long, thin bar, which is removably attachable to a top or bottom of a display device, such as an high definition television monitor. The positions of the components of the integral device 100 are fixed within the device.

The integral device 100 can include a wireless or wired network interface for management of device operations. The wireless or wired network interface can also be used to transmit analytics derived from one or more framing algorithms. These analytics can include, but are not limited to, the number of people in the room, the number of different speakers during the duration of a call, and the estimated seating positions of each person at an endpoint. In one embodiment, the integral device also includes a universal serial bus (USB) interface to transmit similar information over this connection to an external processing unit.

In one embodiment, the integral device 100 includes stereo pickup microphones configured to produce a high-quality stereo audio image for transmission to one or more remote endpoints. The microphone array can be used to accurately determine the location of a person who is talking. The stereo pickup microphones can be part of the microphone array(s) or can be separate from the microphone array(s). A face detection module can frame a group of people without audio. A face detection module can work in conjunction with the microphone array(s) to produce a zoomed-in view of the person talking.

In one embodiment, the high-resolution camera 120 is an Electronic Pan Tilt Zoom (EPTZ) camera with a wide field-of-view that enables the integral device 100 to both to detect people at the endpoint and to electronically zoom in to frame a group of people or to frame an individual talker.

In one embodiment, an external microphone array (not shown in FIG. 1) can be removably connected to the integral device 100. In one embodiment, the external microphone array can be wirelessly coupled to the integral device 100. The external pickup microphone array can be placed closer to conference participants to capture clearer audio from talkers than would be collected by the pickup microphones.

Figure 2:
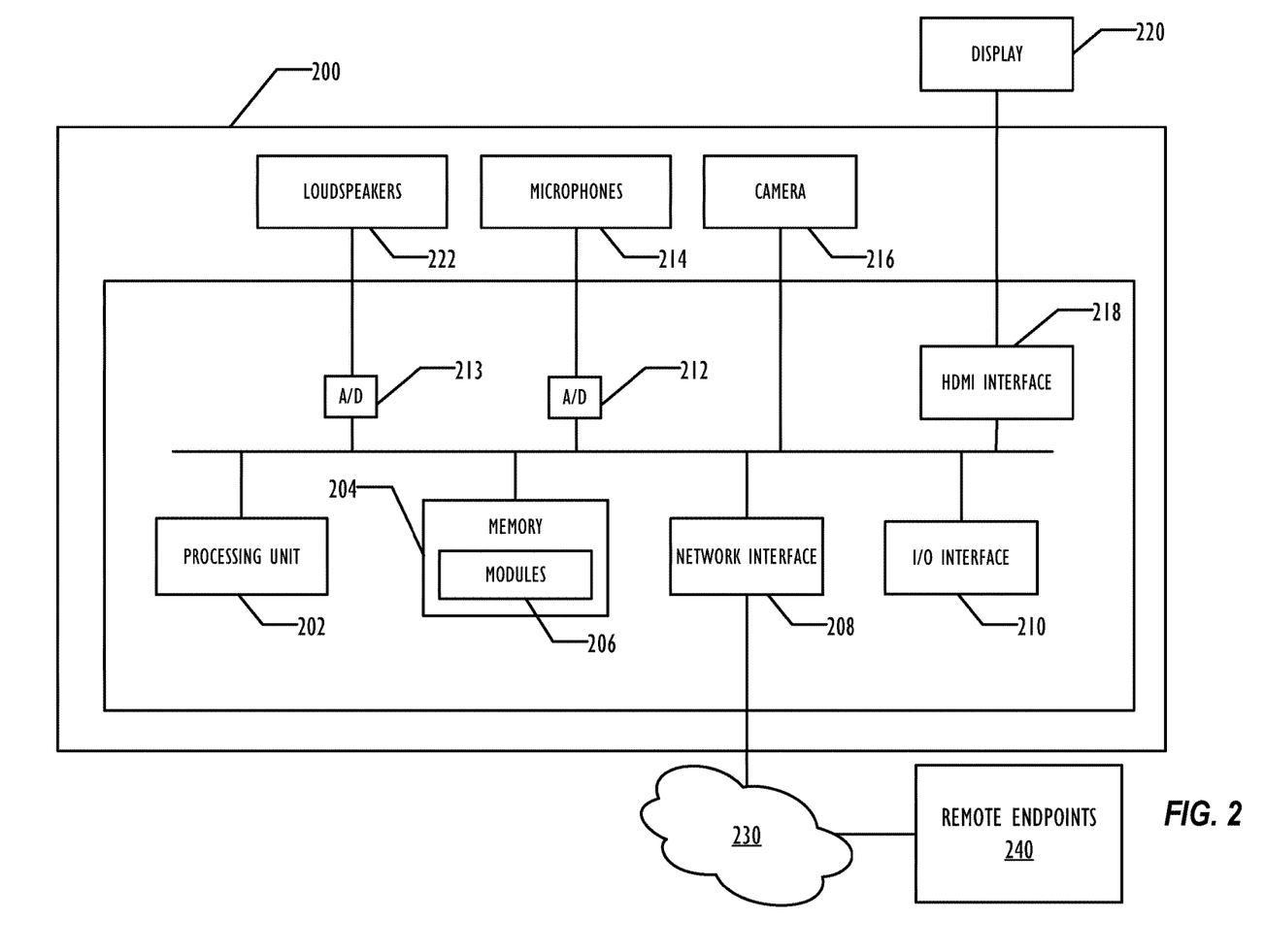
FIG. 2 is a block diagram illustrating the components of a videoconferencing endpoint according to one embodiment.

FIG. 2 is a block diagram of a video conference endpoint 200 according to one embodiment. The video conference endpoint 200 could be the integral device 100 of FIG. 1. A processing unit 202, such as a DSP or central processor unit (CPU) or combination thereof, is present to perform the desired audio and video operations. The upper body and face detection techniques described below allow the processing unit 202 to be a low processing power unit. In one embodiment, the processing unit 202 is a Qualcomm Snapdragon® 625 CPU. (SNAPDRAGON is a registered trademark of Qualcomm, Inc.) A memory 204, which includes programs to perform desired modules 206, such as an upper body detection module, a face detection module, and audio processing modules as well as various video modules, is connected to the processing unit 202. Although illustrated as a bus type connection, any type of connections can be used, including point to point connections.

A network interface 208, such as an Ethernet interface, is connected to the processing unit 202 to allow communication with one or more remote endpoints 240 in the video conference. An input/output (I/O) interface 210 is connected to the processing unit 202 to perform any needed I/O operations. An A/D converter block 212 is connected to the processing unit 202 and to microphones 214. The microphones 214 include an omnidirectional microphone and a directional microphone or microphones. Similarly, at least two loudspeakers 222 are connected to the processing unit 202 via an A/D converter 213. A camera 216 is connected to the processing unit 202 to provide near end video. A High-Definition Multimedia Interface (HDMI®) interface or other type video interface 218 is connected to the processing unit 202 and to an external display 220 to provide video and/or audio output. (HDMI is a registered trademark of HDMI Licensing, LLC.) FIG. 2 is a very simplified diagram of a video conference system endpoint and many other designs are possible, all of which can perform the upper body and face detection operations described below.

The videoconferencing endpoint system 200 communicates with the one or more remote endpoints 240 across one or more networks 230.

After capturing audio and video with the microphones 214 and camera 216, the endpoint 200 encodes it using any of the common encoding standards, such as MPEG-1, MPEG-2, MPEG-4, H.261, H.263, H.264, G729, and G711. Then, the network interface 208 outputs the encoded audio and video to the remote endpoints 240 via the network 230 using any appropriate protocol. Similarly, the network interface 208 receives conference audio and video via the network 230 from the remote endpoints 240 and sends these to codecs for processing. Eventually, the loudspeakers 222 output conference audio, and a display 220 outputs conference video. In one embodiment, the display 220 is an external display, such as a monitor display, coupled to an integral unit such as integral device 100 via an HDMI or other wired or wireless technique. Many of these modules and other components can operate in a conventional manner well known in the art so that further details are not provided here.

Figure 3:
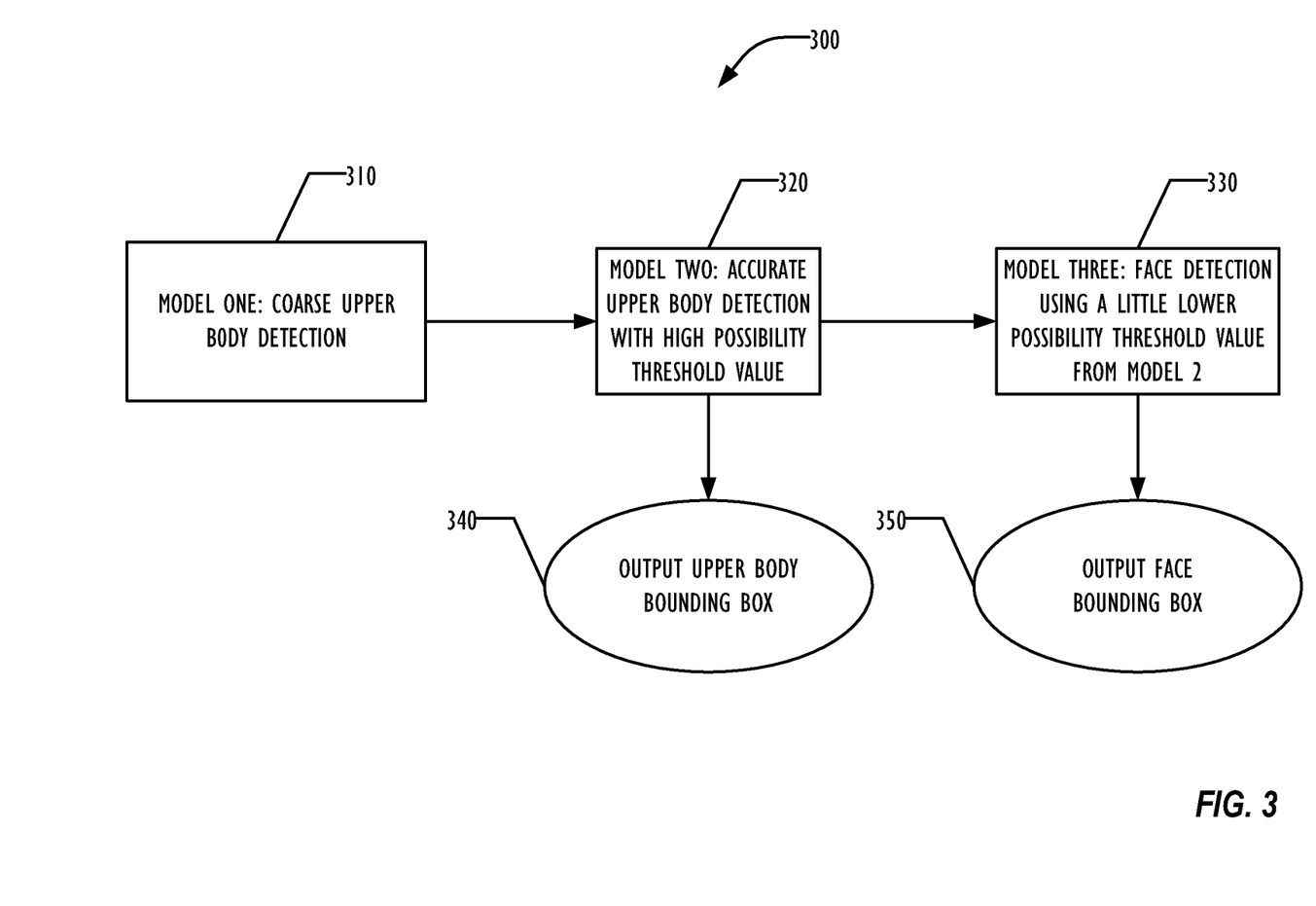
FIG. 3 is a block diagram illustrating a technique for upper body and face detection according to one embodiment.

FIG. 3 is a flowchart illustrating a high-level overall structure of a model pipeline 300 according to one embodiment. In block 310, a first model is employed by a first neural network to detect a candidate area for an upper body. The first model has low accuracy but high speed. In block 320, a second model employed by a second neural network refines the output from the first model with high accuracy but lower speed. However, because the input image size is small (only the candidate areas identified by the first model), the overall speed is high. In some embodiments, the first model may be omitted. The second model outputs one or more upper body bounding boxes 340 with high accuracy. In one embodiment, an accuracy of 85% is attained. The second neural network considers areas for upper body detection that were identified as candidate areas by the first neural network In block 330, a third model takes the output from the second model to detect faces with high accuracy in the areas identified by the second neural network as containing upper bodies, in one embodiment attaining a 91% accuracy. The number of upper bodies detected by the second model can be adjusted by the probabilities to a lower probability threshold, thus the third model can have more input upper bodies and will find more faces. This adjustment is considered desirable to avoid missing faces that should be found in upper body areas that fall outside the high probability threshold for recognizing an upper body used by the second model. The third model outputs one or more face bounding boxes 350, which may then be used for various purposes, such as drawing a box around the face on the screen of the display 220.

In some embodiments, a fourth model may be interposed between the second and third model. In such an embodiment, the fourth model is trained for head detection.

The first, second, third, and fourth models may be deep learning models, with an input layer, an output layer, and a plurality of hidden layers in between the input and output layers. For training the models, undistorted training data may be collected from an open source database, such as the MegaFace database available from the University of Washington. However, because the EPTZ camera 120 in the integral device 100 is a wide-angle camera, which can introduce distortion in the images collected, training data preferably includes similarly distorted image data, collected using a camera similar to the camera 120. Because the MegaFace data is designed for face detection, preferably the bounding box of the face is enlarged to include the upper body, thus allowing the MegaFace data to be used for upper body training data, too. Further, additional upper body training images, such as low resolution 12×12 pixel upper body images may be used as training data. Embodiments of the first, second, third, and fourth models are implemented as Convolutional Neural Network (CNN) models, but other embodiments may use other types of deep learning models.

Figure 4:
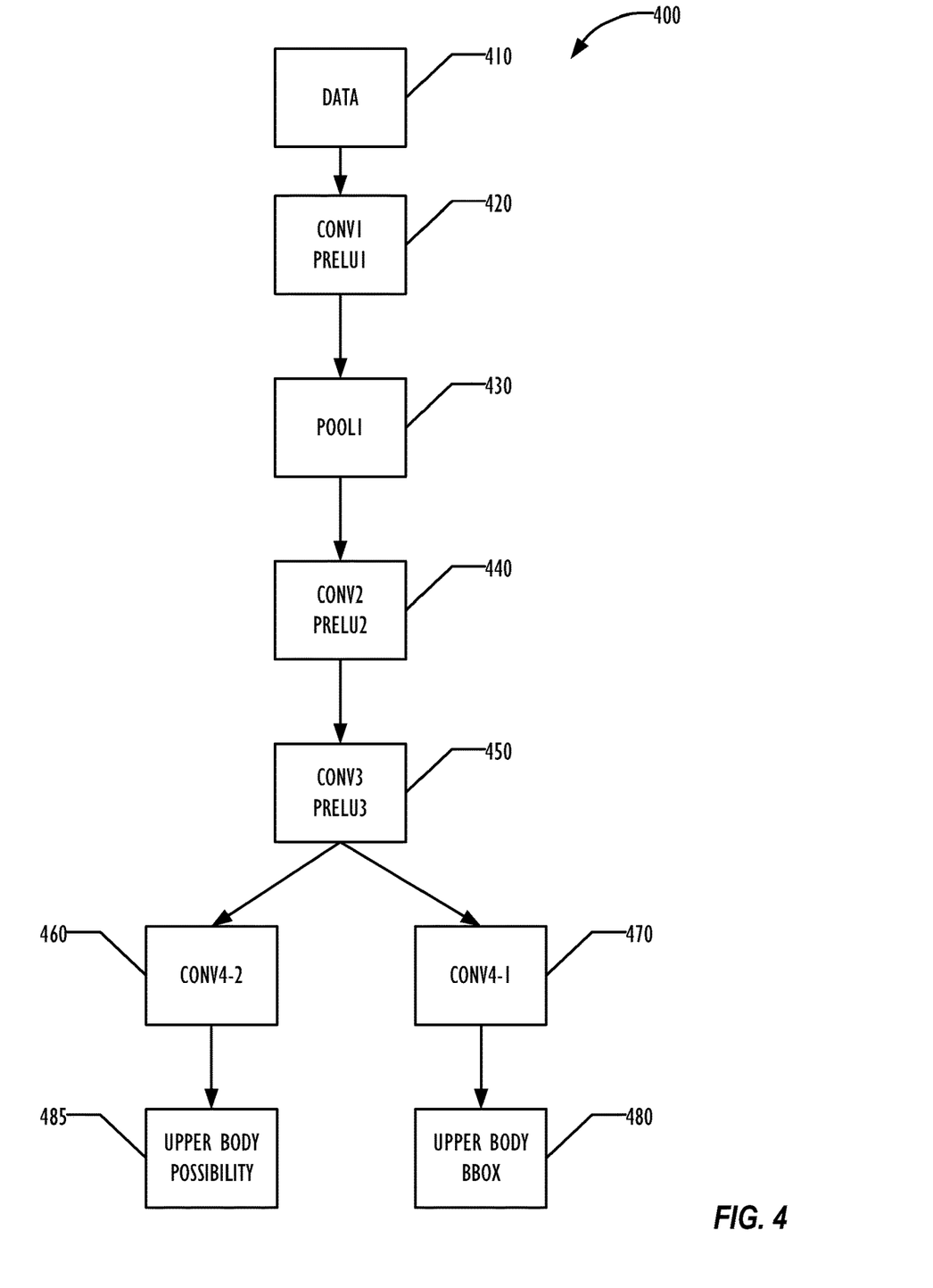
FIG. 4 is a block diagram illustrating layers of a deep learning model for upper body detection according to one embodiment.

FIG. 4 is a block diagram illustrating the layers of the first model 400. In this model, data is received by data layer 410, in this scenario from the camera 216 after processing by video modules of the endpoint 200. In block 420, a convolutional layer is followed with a Parametric Rectified Linear Unit (PReLU) layer. In block 430, the results from block 420 are processed by a pooling layer. In block 440, another convolutional layer and PReLU layer transform the data, followed by block 450, with another convolutional layer and PReLU layer. The output from block 450 is then processed by layers 460 and 470, which are both convolutional layers. Convolutional layer 460 produces the probability of upper bodies, and convolutional layer 470 produces output that corresponds to upper bodies. This finally results in block 480 with an output layer that outputs proposals for upper body bounding boxes. In one embodiment, the data provided to the first model is 12×12 pixel low resolution images, but any desired size images may be used.

In one embodiment, the camera 120 is a 4K camera, but the system is configured to downconvert the video data input to the first model in FIG. 4 to 720P video data for ease of computation.

Figure 5:
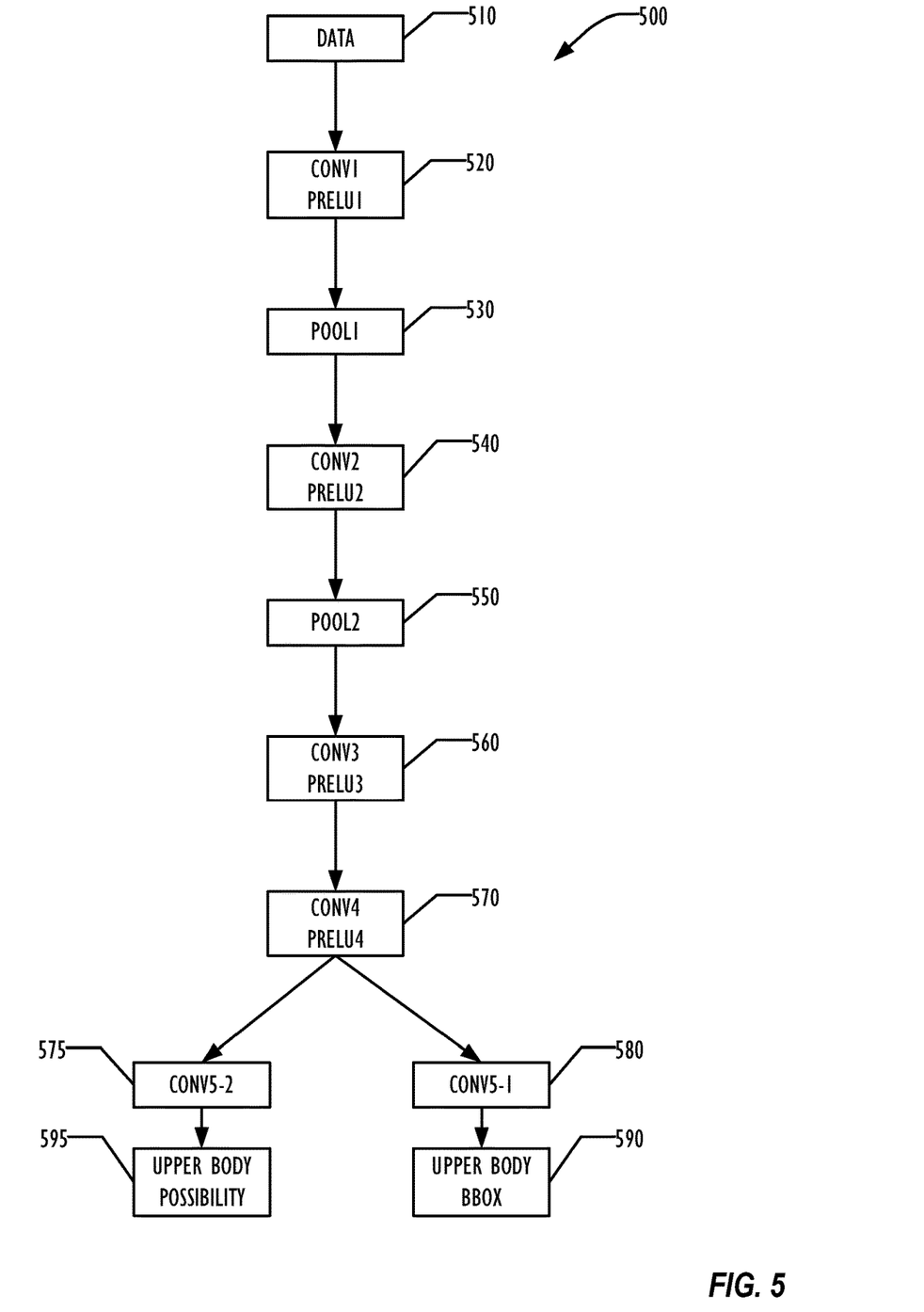
FIG. 5 is a block diagram illustrating layers of a deep learning model for upper body detection according to another embodiment.

FIG. 5 is a block diagram illustrating the layers of the second model 500 according to one embodiment. In this model, the proposed upper body bounding box data is used to provide input to the model in block 510, passing the data to block 520, which comprises a convolutional layer and a PReLU layer. Block 530 then processes the results of block 520 with a pooling layer, the results of which are provided as input in block 540 to a second convolutional layer and a second PReLU layer. Then in block 550 a second pooling layer is provided, followed in block 560 by a third convolutional layer and a third PReLU layer. In block 570 a fourth convolution layer and fourth PReLU layer process the results from block 550, passing their results to two convolutional layers 575 and 580. Convolutional layer 575 produces the probability of upper bodies, output in output layer 595, and convolutional layer 580 produces output that corresponds to upper bodies. Finally, the results are output in output layer 590 as upper body bounding boxes. The second model thus has a more completed model architecture than the first model and the training data resolution is higher, for example using 24×24 pixel images, although the second model may be trained with data from the same training data sources as the first model of FIG. 4. In one embodiment, the upper body detection output from the model may have an accuracy of above 85% with a recall also above 85%. Using a common face detection data set and benchmark such as the FDDB dataset from the Computer Vision Laboratory of the University of Massachusetts at vis-www.cs.umass.edu, one embodiment of the second model can achieve approximately 90% accuracy.

Figure 6:
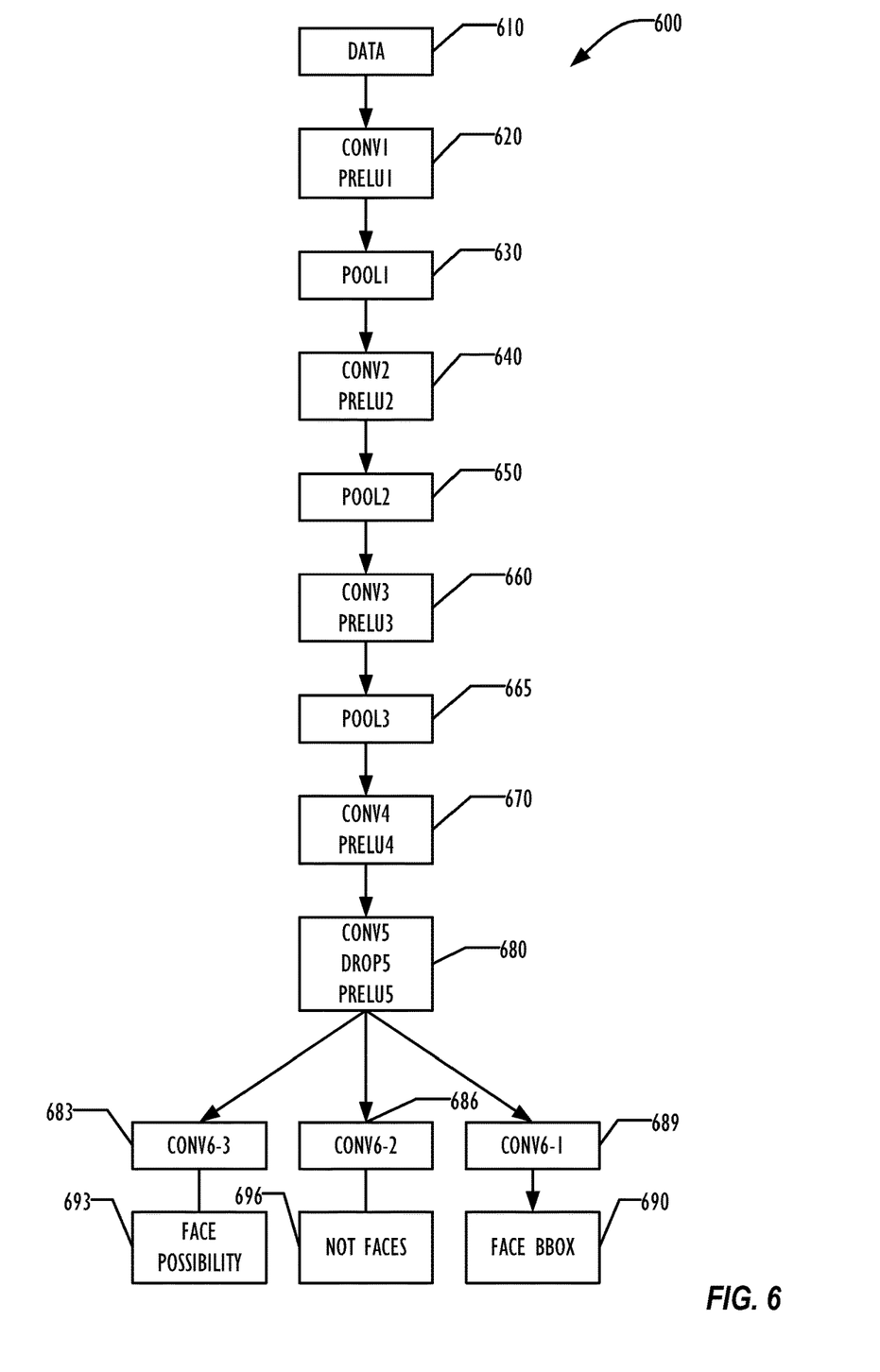
FIG. 6 is a block diagram illustrating layers of a deep learning model for face detection according to one embodiment.

FIG. 6 is a block diagram illustrating a third model 600 according to one embodiment, which is trained to detect faces, using the results of the second model of FIG. 5. Because upper bodies generally have fewer features than faces, face detection is always more accurate than upper body detection. Thus some faces may be lost from the second model's results. To avoid ignoring faces that could be detected in the data, the third model may use the results from the second model with a lower probability threshold than was used to generate the upper body bounding boxes. While doing so in an upper body detection model might result in incorrect upper body detections, the third model is focused on face detection and can refine the upper body detection results. In one embodiment, the images processed by the third model are faces with 48×48 pixel resolution, using both faces from an open database such as Megaface as well as distorted faces that correspond to the distortion introduced by the camera 216.

The third model begins in block 610 with the upper body data, allowing the model to consider only those areas detected as upper bodies. In embodiments in which a fourth model further analyses the upper body data for head detection, the input data in block 610 may be restricted to just those areas detected or identified as heads.

In block 620, a first convolutional layer and a first PReLU layer process the input data, followed in block 630 by a first pooling layer. The results of the first pooling layer are then processed by a second convolution layer and a second PReLU layer in block 640, followed by a second pooling layer in block 650. In block 660, a third convolutional layer and a third PReLU layer process the data from block 650, followed by a third pooling layer in block 665. In block 670, a fourth convolutional layer and a fourth PReLU layer process the data, followed in block 675 by a fifth convolutional layer, a dropout layer, and first PReLU layer. The results of block 675 are then processed by three convolutional layers in blocks 683, 686, and 689. Block 689 results in detected faces, while block 683 results in the probability of detected faces in output layer 693 and 686 produce results for images that are not faces in output layer 696. Finally, in output layer 690, the face bounding blocks are output. In one embodiment, the third model results in face detection bounding boxes with approximately 92% accuracy, with high speed and comparatively low computational requirements.

The particular layers of the models illustrated in FIGS. 4-6 are illustrative and by way of example only. Other embodiments may have other hidden layers of the models as desired, so long as the first and second models perform upper body detection, and the third model performs face detection based on the upper body information detected by the first and second models. Because one of skill in the art of neural network would understand the design of neural networks, no further discussion of the models is considered necessary.

Figure 7:
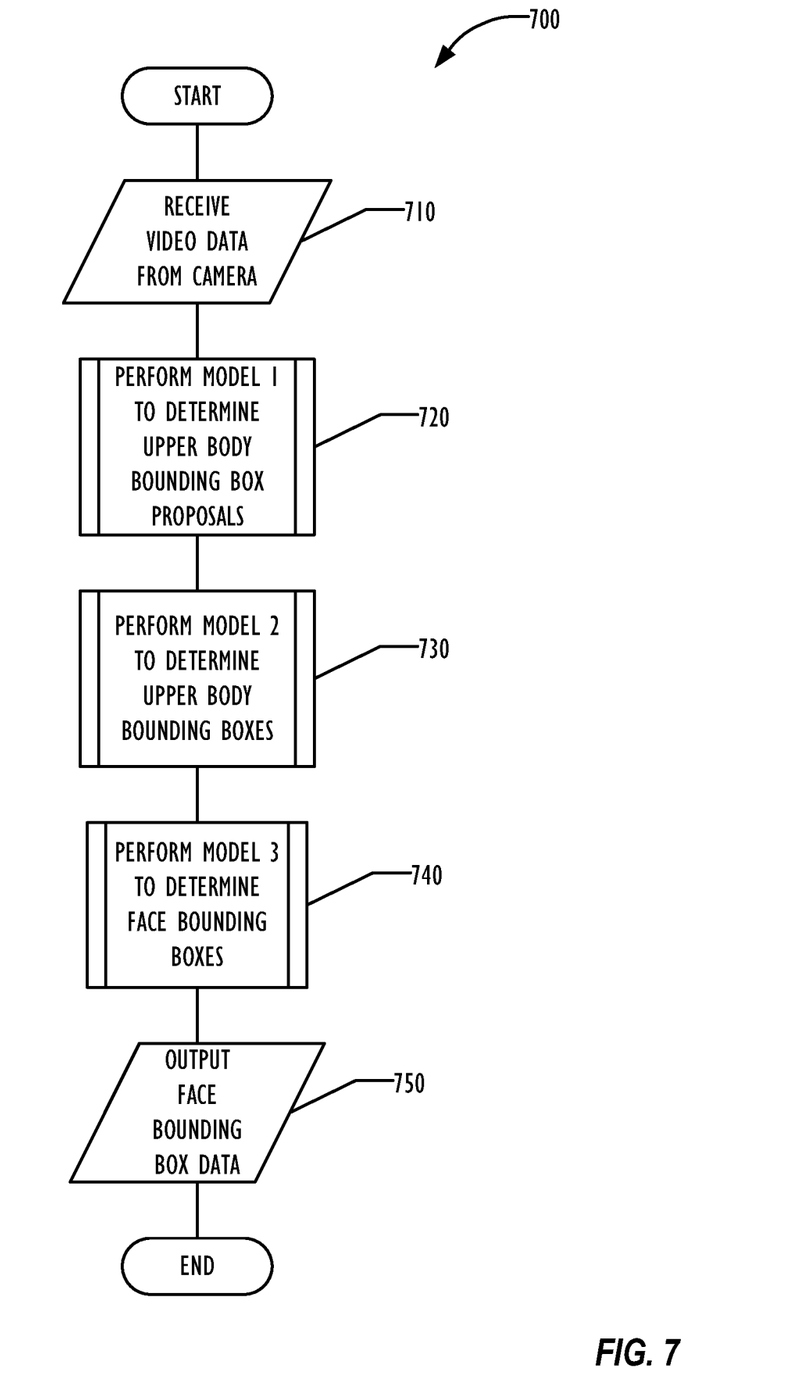
FIG. 7 is a flowchart illustrating a technique for joint upper body and face detection using the models of FIGS. 4-6 according to one embodiment.

Turning now to FIG. 7, a flowchart 700 illustrates the combined technique of cascaded CNN models using the models described in FIGS. 4, 5, and 6. In block 710, video data is received from the camera 216. The first CNN of the first model 400 of FIG. 4 is then used in block 720 to determine proposals for possible upper body areas, using low resolution images. The results of the first CNN are then cascaded into the input to the second CNN in block 730, which uses the second model 500 of FIG. 5 to determine upper body bounding boxes. The upper body bounding boxes can be used for various purposes, such as group framing or active speaker framing. In block 740, the results of the second CNN are then cascaded into the third CNN that uses model 600 of FIG. 6 to detect faces in the areas identified as upper bodies. Finally, in block 750 the technique outputs face bounding box data, which can be used for any number of purposes.

Thus, the models outlined above can detect face and upper body at the same time on a low power processing unit, while retaining an acceptable level of accuracy. The technique is very flexible, and can be retrained to meet different environments, such as distorted video captured by a wide-angle camera. Because of the use of upper body detection, in some cases the technique can even detect people who are facing away from the camera.

The following examples pertain to further embodiments:

Example 1 is a method of detecting faces and upper bodies of participants in a videoconference, comprising: receiving video data from a camera of a videoconferencing endpoint; performing upper body detection in the video data using a first neural network; and performing face detection by a second neural network in areas of the video data identified by the upper body detection of the first neural network.

In Example 2 the subject matter of Example 1 optionally includes further comprising: performing upper body detection in the video data using a third neural network, wherein performing upper body detection in the video data using the first neural network comprises performing upper body detection in areas of the video data identified as possible upper body areas by the third neural network.

In Example 3 the subject matter of any of Examples 1-2 optionally include s wherein receiving video data from the camera of the videoconferencing endpoint comprises receiving video data that is distorted by the camera of the videoconferencing endpoint.

In Example 4 the subject matter of any of Examples 1-2 optionally include s wherein the first neural network and the second neural network employ models that have been trained on both undistorted video images and distorted video images.

In Example 5 the subject matter of any of Examples 1-2 optionally include s wherein performing upper body detection comprises producing upper body bounding box information.

In Example 6 the subject matter of any of Examples 1-2 optionally include s wherein performing face detection comprises: considering areas for face detection having a lower probability threshold than used by the first neural network for upper body detection.

In Example 7 the subject matter of any of Examples 1-2 optionally includes further comprising: performing head detection by a fourth neural network in areas identified as upper bodies by the first neural network, wherein performing face detection comprises performing face detection by the second neural network in areas identified as heads by the fourth neural network.

Example 8 is a videoconferencing endpoint, comprising: a housing; a camera, disposed in the housing; a processing unit, disposed in the housing and coupled to the camera; a memory, disposed in the housing and coupled to the processing unit and the camera, in which are stored instructions for performing face detection and upper body detection, comprising instructions that when executed cause the processing unit to: receive video data from the camera; perform upper body detection in the video data using a first neural network; and perform face detection by a second neural network in areas of the video data identified by the upper body detection of the first neural network.

In Example 9 the subject matter of Example 8 optionally includes wherein the instructions further comprise instructions that when executed cause the processing unit to: perform upper body detection in the third video data using a third neural network, and wherein the instructions that when executed cause the processing unit to perform upper body detection using the first neural network comprise instructions that when executed cause the processing unit to perform upper body detection in areas of the video data identified as possible upper body areas by the third neural network.

In Example 10 the subject matter of any of Examples 8-9 optionally includes wherein the camera is a wide-angle camera producing distorted images.

In Example 11 the subject matter of any of Examples 8-9 optionally includes wherein the first neural network and the second neural network employ models that have been trained on both undistorted video data and distorted video data.

In Example 12 the subject matter of any of Examples 8-9 optionally includes wherein the instructions that when executed cause the processing unit to perform upper body detection comprise instructions that when executed cause the first neural network to generate upper body bounding box information.

In Example 13 the subject matter of any of Examples 8-9 optionally includes wherein the instructions that when executed cause the processing unit to perform face detection comprise instructions to adjust a probability threshold consider areas for face detection having a lower probability of being an upper body than identified by the first neural network as containing upper bodies.

In Example 14 the subject matter of any of Examples 8-9 optionally includes wherein the instructions further comprise instructions that when executed cause the processing unit to: perform head detection by a fourth neural network in areas identified as upper bodies by the first neural network, wherein the instructions that when executed cause the processing unit to perform face detection comprise instructions that when executed cause the processing unit to perform face detection in areas identifies as heads by the fourth neural network.

Example 15 is a videoconferencing endpoint configured for upper body and face detection, comprising: a means for receiving video data from a camera; a first neural network means for detecting upper bodies in the received video data and producing upper body bounding box data; and a second neural network means for detecting faces in the received video data in areas identified as upper bodies by the first neural network means.

In Example 16 the subject matter of Example 15 optionally includes further comprising: a third neural network means for detecting upper bodies in the received video data and identifying areas of the video data as possible upper body areas, wherein the second neural network means comprises neural network means for detecting upper bodies in the areas identified by the third neural network means.

In Example 17 the subject matter of any of Examples 15-16 optionally includes wherein the means for receiving video data comprises a wide angle camera that produces distorted video images.

In Example 18 the subject matter of any of Examples 15-16 optionally includes wherein the first neural network means and second neural network means employ models that have been trained on both undistorted video images and distorted video images.

In Example 19 the subject matter of any of Examples 15-16 optionally includes further comprising: a fourth neural network means for detecting heads in areas identified as upper bodies by the first neural network means, wherein the second neural network means comprises means for performing face detection in areas identified as heads by the fourth neural network means.

Example 20 is a machine readable medium including instructions, that when executed cause a videoconferencing endpoint to perform the methods of examples 1-7.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of detecting faces and upper bodies of participants in a videoconference, comprising:
    receiving video data from a camera of a videoconferencing endpoint;
    performing upper body detection in the video data using a first neural network; and
    performing face detection by a second neural network in areas of the video data identified by the upper body detection of the first neural network.

2. The method of claim 1, further comprising:
    performing upper body detection in the video data using a third neural network,
    wherein performing upper body detection in the video data using the first neural network comprises performing upper body detection in areas of the video data identified as possible upper body areas by the third neural network.

3. The method of claim 1, wherein receiving video data from the camera of the videoconferencing endpoint comprises receiving video data that is distorted by the camera of the videoconferencing endpoint.

4. The method of claim 1, wherein the first neural network and the second neural network employ models that have been trained on both undistorted video images and distorted video images.

5. The method of claim 1, wherein performing upper body detection comprises producing upper body bounding box information.

6. The method of claim 1, wherein performing face detection comprises:
considering areas for face detection having a lower probability threshold than used by the first neural network for upper body detection.

7. The method of claim 1, further comprising:
performing head detection by a fourth neural network in areas identified as upper bodies by the first neural network,
wherein performing face detection comprises performing face detection by the second neural network in areas identified as heads by the fourth neural network.

8. A video conferencing endpoint, comprising:
a housing;
a camera, disposed in the housing;
a processing unit, disposed in the housing and coupled to the camera;
a memory, disposed in the housing and coupled to the processing unit and the camera, in which are stored instructions for performing face detection and upper body detection, comprising instructions that when executed cause the processing unit to:
receive video data from the camera;
perform upper body detection in the video data using a first neural network; and
perform face detection by a second neural network in areas of the video data identified by the upper body detection of the first neural network.

9. The videoconferencing endpoint of claim 8,
wherein the instructions further comprise instructions that when executed cause the processing unit to:
perform upper body detection in the third video data using a third neural network, and
wherein the instructions that when executed cause the processing unit to perform upper body detection using the first neural network comprise instructions that when executed cause the processing unit to:
perform upper body detection in areas of the video data identified as possible upper body areas by the third neural network.

10. The videoconferencing endpoint of claim 8, wherein the camera is a wide-angle camera producing distorted images.

11. The videoconferencing endpoint of claim 8, wherein the first neural network and the second neural network employ models that have been trained on both undistorted video data and distorted video data.

12. The videoconferencing endpoint of claim 8, wherein the instructions that when executed cause the processing unit to perform upper body detection comprise instructions that when executed cause the first neural network to generate upper body bounding box information.

13. The videoconferencing endpoint of claim 8, wherein the instructions that when executed cause the processing unit to perform face detection comprise instructions to adjust a probability threshold consider areas for face detection having a lower probability of being an upper body than identified by the first neural network as containing upper bodies.

14. The videoconferencing endpoint of claim 8, wherein the instructions further comprise instructions that when executed cause the processing unit to:
perform head detection by a fourth neural network in areas identified as upper bodies by the first neural network,
wherein the instructions that when executed cause the processing unit to perform face detection comprise instructions that when executed cause the processing unit to perform face detection in areas identifies as heads by the fourth neural network.

15. A non-transitory machine readable medium including instructions, that when executed cause a processing unit of a videoconferencing endpoint to perform the methods of:
receiving video data from a camera of a videoconferencing endpoint;
performing upper body detection in the video data using a first neural network; and
performing face detection by a second neural network in areas of the video data identified by the upper body detection of the first neural network.

16. The non-transitory machine readable medium of claim 15, the method further comprising:
performing upper body detection in the video data using a third neural network,
wherein performing upper body detection in the video data using the first neural network comprises performing upper body detection in areas of the video data identified as possible upper body areas by the third neural network.

17. The non-transitory machine readable medium of claim 15, wherein receiving video data from the camera of the videoconferencing endpoint comprises receiving video data that is distorted by the camera of the videoconferencing endpoint.

18. The non-transitory machine readable medium of claim 15, wherein the first neural network and the second neural network employ models that have been trained on both undistorted video images and distorted video images.

19. The non-transitory machine readable medium of claim 15, wherein performing upper body detection comprises producing upper body bounding box information.

20. The non-transitory machine readable medium of claim 15, wherein performing face detection comprises:
considering areas for face detection having a lower probability threshold than used by the first neural network for upper body detection.

21. The non-transitory machine readable medium of claim 15, the method further comprising:
performing head detection by a fourth neural network in areas identified as upper bodies by the first neural network,
wherein performing face detection comprises performing face detection by the second neural network in areas identified as heads by the fourth neural network.

* * * * *

UNITED STATES PATENT AND TRADEMARK OFFICE
CERTIFICATE OF CORRECTION

PATENT NO. : 11,775,834 B2  
APPLICATION NO. : 17/294573  
DATED : October 3, 2023  
INVENTOR(S) : Hai Xu et al.

Page 1 of 1

It is certified that error appears in the above-identified patent and that said Letters Patent is hereby corrected as shown below:

On the Title Page

In The Abstract (57):  
Line 9, "faces well" should be --faces as well--.

In the Specification

Column 8, Line 12, "include s" should be --includes--.

Column 8, Line 17, "include s" should be --includes--.

Column 8, Line 22, "include s" should be --includes--.

Column 8, Line 26, "include s" should be --includes--.

Signed and Sealed this  
Twenty-sixth Day of December, 2023

Katherine Kelly Vidal  
*Director of the United States Patent and Trademark Office*